A. KÖNIG.
LOOKOUT TELESCOPE.
APPLICATION FILED MAR. 26, 1915.

1,170,912.

Patented Feb. 8, 1916.
2 SHEETS—SHEET 1.

Witnesses:

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

LOOKOUT-TELESCOPE.

1,170,912.  Specification of Letters Patent.  Patented Feb. 8, 1916.

Application filed March 26, 1915. Serial No. 17,300.

*To all whom it may concern:*

Be it known that I, ALBERT KÖNIG, a citizen of the German Empire, residing at Jena, Germany, have invented a new and useful Lookout-Telescope, of which the following is a specification.

The invention relates to so called look-out telescopes, i. e. to telescopes of fairly large dimensions having an approximately vertical axis and a horizontal direction of inspection and look-out for observing the country-side from out of a covered position, and more particularly to look-out telescopes, in which the lower part of the telescope is rigid and its upper part, for the purpose of a variable look-out height, is attached to a mast of adjustable height, so that it is possible to take the look-out height not greater than the actual cover requires.

Specially the invention relates to look-out telescopes, in which the upper part of the telescope carries an objective and a collective lens and in which the lower part of the telescope contains a lens-system of reversion and an ocular. As with this arrangement the single rays of each ray pencil passing from the upper part to the lower part do not run parallel to each other, up to the present the telescope had to be adapted to the different look-out heights by displacing the reversing system, in order to keep the ocular substantially in the same position. This displacement of the reversing system, however, caused an undesired considerable change of the power of the telescope and thereby a considerable change of the size of that part of the country-side, which is visible in the telescope. According to the invention this change of power may be considerably reduced by composing the reversing system of two members, a rigid front member and a displaceable rear member, the front member being positive and having the greater (absolute) focal length. With such an arrangement the power may be kept constant the better, the smaller the focal length of the displaceable member. In order to keep the power quite constant or nearly constant, the focal length of the rear member of the reversing system would have to be so small, that the practical performance was attended with difficulties. The same result, however, is obtained without getting practically too small focal lengths, if, beside the rear member, the front member too be disposed displaceably.

Figure 1:
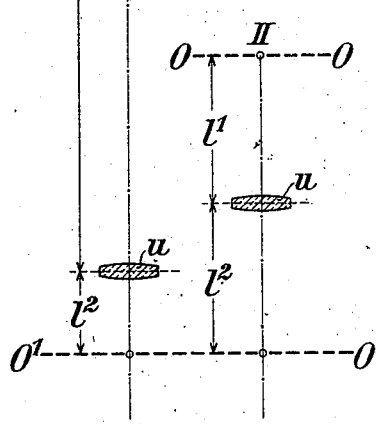
Figure 2:
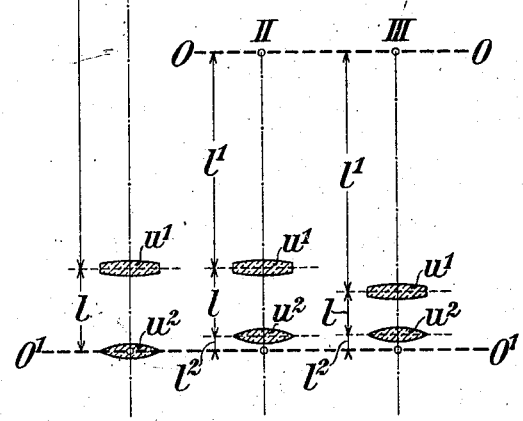
Figure 3:
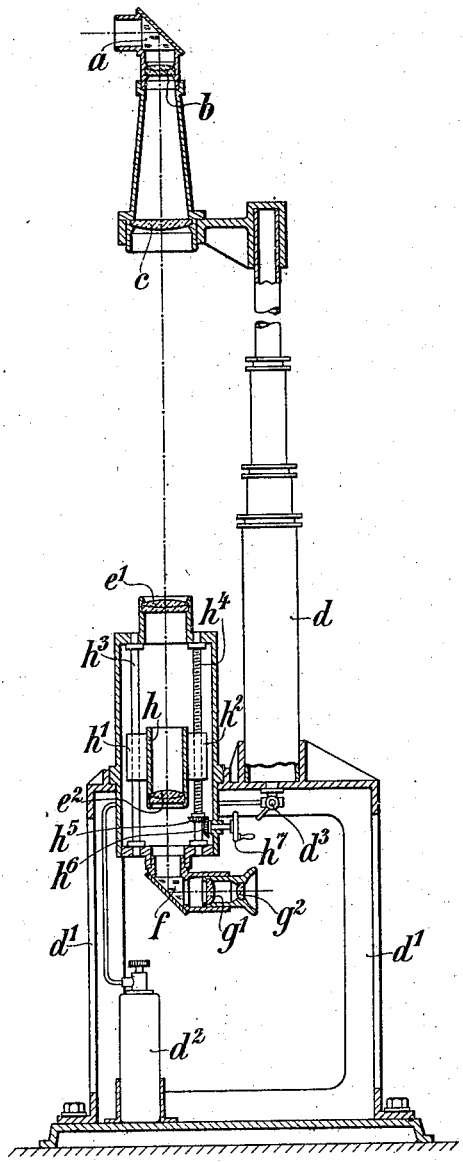

In the annexed drawing Figures 1 and 2 diagrammatically show some optical systems, the progress caused by the invention to be illustrated by means of these figures by some numerical examples; Fig. 3 shows in a longitudinal section a constructional example.

Fig. 1 relates to a look-out telescope of well-known kind fitted with a simple reversing system, Fig. 2 to a telescope according to the invention. Each of these two figures shows diagrammatically the position of the reversing system (Fig. 2 the position of the two members of the reversing system) corresponding to two different look-out heights. In both figures the objective image plane forming simultaneously the front image plane of the reversing system is indicated, in each of its two different positions by a dotted line O—O, while the ocular focal plane, which coincides with the rear image plane of the reversing system and is to keep its position unaltered, is shown by a dotted line $O^1$—$O^1$.

In Fig. 1 a reversing system $u$ of the focal length F=1 is assumed. In the drawn disposition I the distance between the objective image plane and the reversing system is $l^1$=11 and the distance between the reversing system and the ocular focal plane $l^2$=1.1, therefrom the power corresponding to the image formed by the reversing system results as N=0.1. In the disposition II the upper part of the telescope is assumed to be let down so far, that the primary distance between the objective image plane and the ocular focal plane has decreased from 12.1 to 4. In order that the rear image plane of the reversing system keeps its position, the reversing system is to be displaced toward the objective for an amount of 0.9, so that $l^1$=$l^2$=2. Consequently the power corresponding to the image formed is N=1 and thus, compared with that corresponding to the image formed in the disposition I, increases to the tenfold amount.

In Fig. 2 the reversing system is assumed to be composed of two positive members, the front member $u^1$ having a focal length $F^1$=1 and the rear member having a focal length $F^2$=0.25. The look-out height corresponding to the disposition I of the drawing is taken the same as that corresponding to the disposition I of Fig. 1. The distance between the objective image plane and the front member $u^1$ is $l^1=11$, the distance between the two members $u^1$ and $u^2$ $l^1=1.1$. The rear member $u^2$ is fitted in the ocular focal plane $O^1$—$O^1$. As in this position the member $u^2$ does not influence the imaging the power corresponding to such an arrangement is again $N=0.1$ as in the disposition I of Fig. 1. In the dispositions II and III the look-out height is assumed to be the same reduced one as that in the disposition II of Fig. 1, so that the distance between the objective image plane and the ocular focal plane also amounts to 4. In order to adapt the telescope to the smaller look-out height, in the disposition II only the rear member $u^2$ is displaced, while the front member $u^1$ keeps its place. Hence it follows $l^1=2.9$, and the other distances result according to the condition that the rear image plane is again supposed to keep its place as $l=0.923$ and $l^2=0.177$. The power corresponding to such an arrangement results as $N=0.154$ and thus compared with that corresponding to the disposition I, has increased only to the 1.54-fold amount. In the disposition III both members of the reversing system are moved out of their place hold in the disposition I, and in order to form again an image in the ocular focal plane the following distances are chosen: $l^1=3.227$ $l=0.579$; $l^2=0.194$. The power obtained with such an arrangement results as $N=0.1$ and thus equals the power obtained with the disposition I.

In the constructional example of a look-out telescope according to the invention, shown in Fig. 3 of the drawing, the rear member of the reversing system of this telescope being disposed displaceably. In this example the upper part of the telescope being adjustable in the height-direction and containing as optical parts a reflecting prism $a$, an objective $b$ and a collective $c$, which is disposed in the image plane of the objective, is carried by a telescopic tubular system $d$, which is mounted laterally of the optical axis on a frame $d^1$ forming the substructure. The moving of the tubular system is effected by means of a compressed gas, which is obtained from a steel bottle $d^2$ and is conducted to the interior of the tubular system by a three-way cock $d^3$. The frame $d^1$ serves as carrier of the lower part of the telescope, which contains as optical parts a reversing system comprising two members $e^1$ and $e^2$, a reflecting prism $f$ and an ocular system $g^1$, $g^2$. The front member $e^1$ of the reversing system is fitted immovably in the casing, while the rear member $e^2$ is fixed to a bushing $h$, which by means of two extension pieces $h^1$ and $h^2$ is guided in the direction of the axis of the telescope on two spindles $h^3$ and $h^4$, which are mounted within the casing. Of these two spindles one, $h^4$, is threaded as well as the corresponding extension piece $h^2$ of the bushing $h$ and can be turned by means of a pair of bevel wheels $h^5$, $h^6$ and by a hand wheel $h^7$, which is disposed outside the casing, so that, for adapting the telescope to the look-out height chosen, the member $e^2$ of the reversing system can be displaced in the direction of the optical axis by turning the said hand wheel $h^7$.

I claim:

In a look-out telescope two tubes, an upper one and a lower one, each having its axis broken, disposed one above the other, the axis of emergence of the upper tube and the axis of entrance of the lower tube being substantially vertical, the upper tube being fitted displaceably in the direction of its axis of emergence and containing an objective and a collective lens and the lower tube being rigidly fixed and containing a lens-system of revision and an ocular, which lens-system of revision consists of two members, a front member and a rear member, the front member being positive and having a greater (absolute) focal length than the rear member, of which two members at least the rear member being disposed displaceably in the direction of the optical axis.

ALBERT KÖNIG.

Witnesses:
PAUL KRÜGER,
RICHARD HAHN.